US012140047B2

(12) United States Patent
Obereich

(10) Patent No.: US 12,140,047 B2
(45) Date of Patent: Nov. 12, 2024

(54) ASSEMBLY FOR A GAS TURBINE ENGINE AND METHOD OF ATTACHING A BLADE RETENTION PLATE TO A ROTOR DISK OF A GAS TURBINE ENGINE

(71) Applicant: Rolls-Royce Deutschland Ltd & Co KG, Blankenfelde-Mahlow (DE)

(72) Inventor: Falko Obereich, Ruhland GT Arnsdorf (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 0 days.

(21) Appl. No.: 18/544,926

(22) Filed: Dec. 19, 2023

(65) Prior Publication Data

US 2024/0218799 A1 Jul. 4, 2024

(30) Foreign Application Priority Data

Dec. 28, 2022 (DE) ..................... 10 2022 134 909.8

(51) Int. Cl.
*F01D 5/30* (2006.01)

(52) U.S. Cl.
CPC ........ *F01D 5/3015* (2013.01); *F05D 2240/80* (2013.01); *F05D 2260/30* (2013.01)

(58) Field of Classification Search
CPC . F01D 5/3015; F05D 2240/80; F05D 2260/30
See application file for complete search history.

(56) References Cited

U.S. PATENT DOCUMENTS

| | | | | |
|---|---|---|---|---|
| 6,234,756 B1 * | 5/2001 | Ress, Jr. | ............... | F01D 5/3015 403/326 |
| 2003/0194318 A1 * | 10/2003 | Duesler | ................... | F01D 5/326 416/220 R |
| 2005/0265849 A1 | 12/2005 | Bobo et al. | | |
| 2007/0237645 A1 | 10/2007 | Garin et al. | | |
| 2014/0119916 A1 * | 5/2014 | Faulder | ..................... | F01D 5/22 416/95 |

(Continued)

FOREIGN PATENT DOCUMENTS

| | | | | |
|---|---|---|---|---|
| DE | 112013004811 T5 | 8/2015 | | |
| GB | 2274688 A * | 8/1994 | ............ | F01D 11/006 |

OTHER PUBLICATIONS

German Search Report dated Aug. 3, 2023 from counterpart German Patent Application No. 10 2022 134 909.8.

*Primary Examiner* — J. Todd Newton
*Assistant Examiner* — Aye S Htay
(74) *Attorney, Agent, or Firm* — SHUTTLEWORTH & INGERSOLL, P.L.C.; Timothy J. Klima

(57) ABSTRACT

The invention relates to an assembly for a gas turbine engine which has a rotor disc, rotor blades and an annular blade retention plate, which adjoins the axially front side or the axially rear side of the rotor disc. The blade retention plate includes a radially outer region, which fixes the rotor blades axially, and a radially inner region, which is fixed axially by means of a securing ring in a recess on the axially front side or on the axially rear side of the rotor disc. Provision is made for the radially inner region of the blade retention plate to bear on the securing ring under axial preload. The invention relates further to a method for fastening a blade retention plate to a rotor disc of a gas turbine engine.

13 Claims, 6 Drawing Sheets

(56) References Cited

U.S. PATENT DOCUMENTS

2014/0356177 A1* 12/2014 Snyder .................... B23P 15/04
29/889.21
2018/0066529 A1* 3/2018 Wadsworth ............... F01D 5/06

* cited by examiner

ASSEMBLY FOR A GAS TURBINE ENGINE AND METHOD OF ATTACHING A BLADE RETENTION PLATE TO A ROTOR DISK OF A GAS TURBINE ENGINE

This application claims priority to German Patent Application 102022134909.8 filed Dec. 28, 2022, the entirety of which is incorporated by reference herein.

DESCRIPTION

The invention relates to an assembly for a gas turbine engine and a method for fastening a blade retention plate to a rotor disc of a gas turbine engine according to the present disclosure.

It is known to connect rotor blades to a rotor disc via dovetail connections. A blade retention plate is used to axially fix the rotor blades inserted into the dovetail grooves by their blade root.

A corresponding blade retention plate is known, for example from US 2005/0265849 A1. There is the problem that the mounting of the blade retention plate is relatively complicated, since a securing ring, which fixes the radially inner end of the blade retention plate axially, must be pre-mounted.

The present invention is based on the object of providing an assembly for a gas turbine engine which permits simple mounting of a blade retention plate and an associated securing ring on a rotor disc. Furthermore, a method for fastening a blade retention plate to a rotor disc is to be provided.

This object is achieved by an assembly and a method having features as disclosed herein. Embodiments of the invention are indicated in the present disclosure.

Accordingly, according to a first aspect of the invention, the invention considers an assembly for a gas turbine engine which has a rotor disc with an axially front side, an axially rear side and a radially outer side, grooves extending axially being formed in the radially outer side. In addition, the assembly comprises rotor blades, which each have a blade leaf, a platform and a blade root, wherein the blade roots extend radially inwards from the platform and are inserted into the grooves. Further provided is an annular blade retention plate, which adjoins the axially front side or the axially rear side of the rotor disc and which has: a radially outer region, which axially fixes the rotor blades, and a radially inner region, which is fixed axially by means of a securing ring in a recess on the axially front side or on the axially rear side of the rotor disc.

Provision is made for the radially inner region of the blade retention plate to bear on the securing ring under axial preload.

The present invention is based on the idea of bringing the radially inner region of the blade retention plate into contact with the securing ring under axial preload and, as a result, fixing it axially. This implies an elastic deformation of the radially inner region in the axial direction towards the rotor blade during the mounting, which, during the production of the assembly, permits the securing ring to be fastened in the recess in the rotor disc only after the blade retention plate. The installation space needed for the mounting of the securing ring is provided by the axial deformation of the blade retention plate. Following the mounting of the securing ring, a force leading to the elastic deformation of the radially inner region can then be removed, the radially inner region of the blade plate relaxing axially and coming to bear on the securing ring under preload.

The present invention therefore permits simplification of the mounting of the assembly, since it is no longer necessary to pre-mount the securing ring. As a result of the simplified mounting, complex geometries in the recess of the rotor disc are avoided and the production costs reduced.

A further advantage associated with the present invention consists in the fact that because of the preload with which the blade retention plate bears on the securing ring, there are no gaps or there is no play between the lower region of the blade retention plate and the securing ring, so that an axial fixing of high quality is provided and the danger of vibrations is reduced. The wear on the contact surfaces of the components is likewise reduced because of the relative movements which are reduced to a minimum. The axial fixing of the blade retention plate is achieved via an axial preload of the blade retention plate between the radially outer side of the rotor disc in the region of the axially extending grooves and the securing ring.

One refinement of the invention provides for the securing ring to be arranged in a radially aligned groove, which is formed in or on the recess, to project out of the groove in the radial direction in a radially outer region. The securing ring is formed as an open ring with two adjacent ends (corresponding to a circlip), so that it can be pressed into the groove, the securing ring in the groove being compressed radially with the effect that its radius decreases. Provision can be made for the securing ring to be compressed radially to a maximum in the groove and for the securing ring accordingly to extend as far as the bottom of the groove. The two ends of the securing ring then rest substantially on each other. A mounting gap between the ends of the securing ring when the assembly is mounted is avoided as a result.

A further refinement of the invention provides for the blade retention plate to bear with a radially extending first surface on the radially outer region of the securing ring projecting out of the groove. The radially extending first surface is formed, for example, by a step formed by the blade retention plate in the radially inner region, wherein the radially extending first surface connects an axially extending second surface to an axially extending third surface.

Furthermore, provision can be made for the step to be formed in a portion of a projection of the blade retention plate which projects into the recess. The projection is used to fix the blade retention plate in the radial direction. To this end, the projection has, for example, an axially extending surface, which bears on an axially extending surface of the recess and fixes the blade retention plate in the radial direction.

A further refinement of the invention provides for the radially outer region of the blade retention plate, which bears on the outer region of the rotor disc, to axially fix the blade roots of the rotor blades inserted into the grooves. To this end, provision can be made for the radially outer region to form a radially extending supporting surface, which adjoins an axially rear, radially extending front face of the blade roots and which prevents an axial movement of the rotor blades towards the rear. In a further refinement, provision can be made for the radially outer end of the blade retention plate to project into a radially inwardly directed groove at the axially rear end of the rotor blades in order to fix the rotor blades axially in both directions.

According to one refinement, the grooves in the radially outer side of the rotor disc are formed as dovetail grooves, so that the blade roots are connected to the rotor disc in a known manner via a dovetail connection However, the blade roots can in principle also be connected to the rotor disc in another way or via differently shaped form-fitting connections.

The invention also relates to a gas turbine engine having an assembly according to the present disclosure, wherein the gas turbine engine has a turbine which comprises at least one stage having a stator and a rotor, and the assembly is implemented on the rotor of the stage.

In a further aspect of the invention, the present invention relates to a method for fastening a blade retention plate to a rotor disc of gas turbine engine. The method comprises the steps of:

- providing a rotor disc, which comprises an axially front side, an axially rear side and a radially outer side, wherein axially extending grooves are formed in the radially outer side and a recess is formed on the axially front side and/or on the axially rear side,
- providing rotor blades, which each have a blade leaf, a platform and a blade root,
- providing an annular blade retention plate, which has a radially outer region and a radially inner region,
- mounting the blade roots of the rotor blades in the axially extending grooves of the rotor disc, and mounting the blade retention plate on the axially front side or the axially rear side of the rotor disc. The mounting of the blade retention plate comprises
- the radially outer region of the blade retention plate fixing the rotor blades axially, and
- the radially inner region of the blade retention plate being fixed axially by means of a securing ring in the recess on the axially front side or on the axially rear side of the rotor disc. The latter is done in that
- the radially inner region of the blade retention plate is elastically deformed axially in the direction of the rotor disc by applying a force
- then, during the elastic deformation of the radially inner region, a securing ring is introduced into a radially aligned groove which is formed in the recess, the securing ring projecting with a radially outer region out of the groove in the radial direction, and
- the elastic deformation of the radially inner region being cancelled, the radially inner region coming to bear on the securing ring.

The method according to the invention is based on the idea of creating the necessary installation space for the mounting of the securing ring by means of elastic deformation of the radially inner region of the blade retention plate in the axial direction towards the rotor blade. During the elastic deformation of the blade retention plate, the radially outer region of the blade retention plate is supported on the radially outer side of the rotor disc in the region of the axially extending grooves. The installation space created makes it possible to install and to fasten the securing ring in the recess only after the blade retention plate. If the elastic deformation of the radially inner region of the blade retention plate is cancelled (because the force exerted for the elastic deformation is removed), the radially inner region comes to lie on the securing ring, so that the blade retention plate is fixed axially in its radially inner region.

It is pointed out that the two steps of mounting the blade roots of the rotor blades in the axially extending grooves of the rotor disc and of mounting the blade retention plate on the axially front side or the axially rear side of the rotor disc can be carried out jointly, i.e. in one refinement all the rotor blades are mounted on the rotor disc together with the blade retention plate.

One refinement provides for the securing ring to be compressed radially as it is introduced into the radially aligned groove. Here, provision is made to select the distance between the ends of the securing ring in the unstressed state in such a way that after the securing ring has been inserted or pressed into the groove and the associated radial compression of the securing ring, this distance is substantially eliminated. This is associated with the advantage that the securing ring is able to fulfil its function of axially fixing the blade retention plate substantially over 360°, and no mounting gap remains in the mounted state.

A further refinement of the method provides for the radially inner region of the blade retention plate to come to bear with a radially extending first surface on the radially outer region of the securing ring that projects out of the groove. The radially extending first surface can be part of a step, wherein the radially extending first surface connects an axially extending second surface to an axially extending third surface. The securing ring fixes the blade retention plate only in the axial direction, whereas the blade retention plate fixes the securing ring both in the axial and in the radial direction.

Provision can be made for the blade retention plate to be fixed in the radial direction by means of a projection in the recess of the rotor disc. Provision can be made for the securing ring to be pre-mounted on the projection. This permits simple handling of the securing ring during the mounting, since it is already carried along on the blade retention plate.

Furthermore, provision can be made for the securing ring to be stretched radially during pre-mounting and to slide automatically into the groove during the final mounting because of the radial stretching and to have to be compressed only a little in the latter. In this way, the mounting of the securing ring is simplified.

It has already been pointed out that the blade retention plate can be mounted on the axially front side or the axially rear side of the rotor disc. Refinements are also possible in which a blade retention plate is mounted both on the axially front side and on the axially rear side of the rotor disc. If the blade retention plate is mounted on the axially rear side of the rotor disc, then in its radially outer region, the blade retention plate additionally fulfils a sealing function, since a leakage air flow through the mounting gap between the axially extending grooves in the outer side of the rotor disc and the blade roots of the rotor discs is avoided by the blade retention plate.

It is pointed out that the present invention is described with reference to a cylindrical coordinate system which has the coordinates x, r, and φ. Here, x indicates the axial direction, r the radial direction and φ the angle in the circumferential direction. The axial direction is identical to the machine axis of the gas turbine engine, the axial direction basically pointing from the engine intake in the direction of the engine outlet; in the present description the term "axial direction" is, however, used to designate both directions, i.e. axially rearwards towards the engine outlet and axially forwards towards the engine intake. Proceeding from the x-axis, the radial direction points radially outward. Terms such as "in front of", "behind", "front", and "rear" relate to the axial direction, or the flow direction in the engine. Terms such as "outer" or "inner" relate to the radial direction.

The invention will be explained in greater detail below by means of a plurality of exemplary embodiments and with reference to the figures of the drawing, in which.

Figure 1:
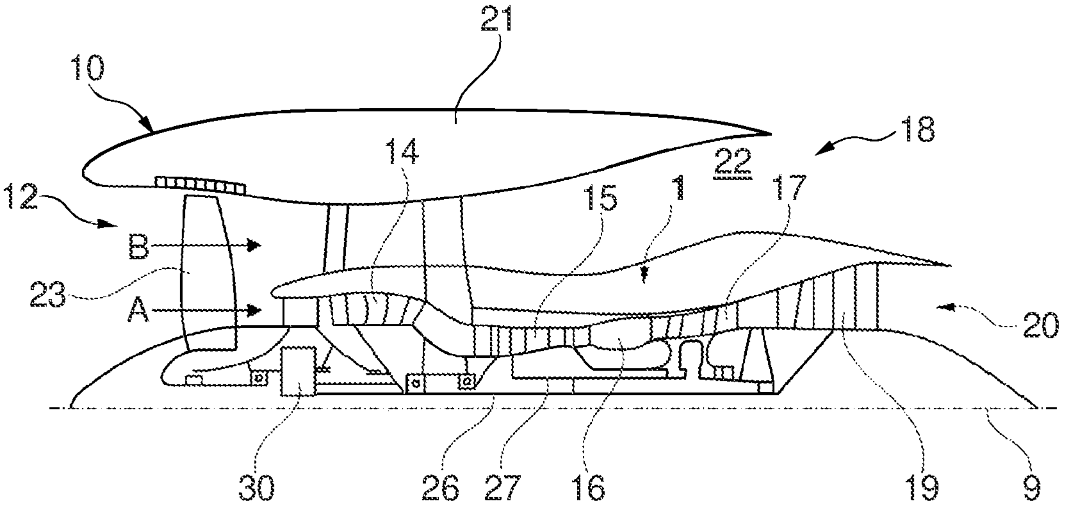
FIG. 1 shows a sectional side view of a gas turbine engine in which the present invention can be implemented.
Figure 2:
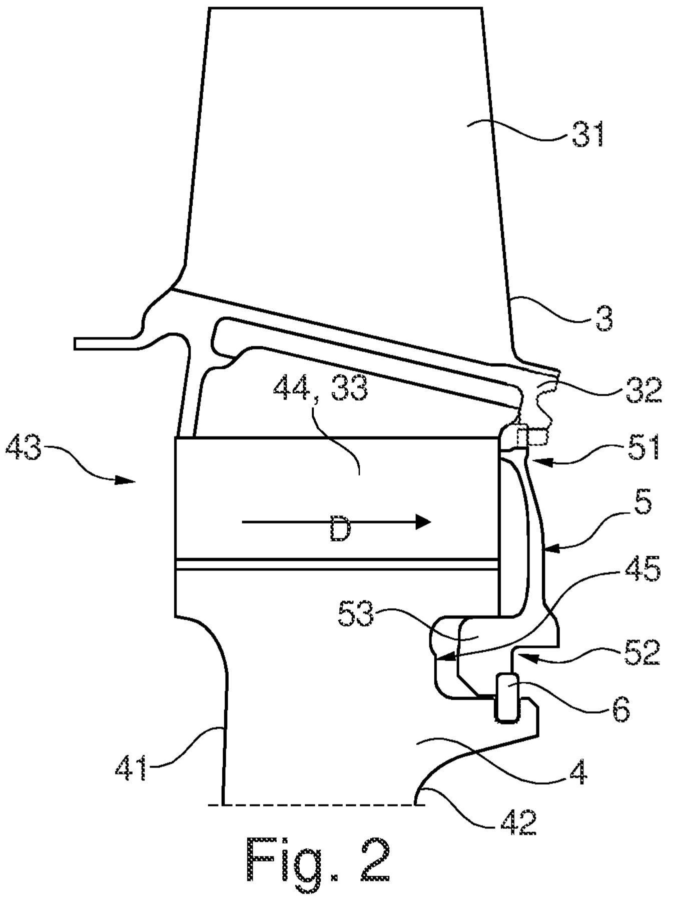
FIG. 2 shows an assembly of a gas turbine engine which comprises a rotor disc, rotor blades fixed thereto and a blade retention plate, wherein the blade retention plate bears with axial preload on the outer side of the rotor disc in the region of the axially extending grooves and a securing ring secured to the rotor disc.
Figure 2A:
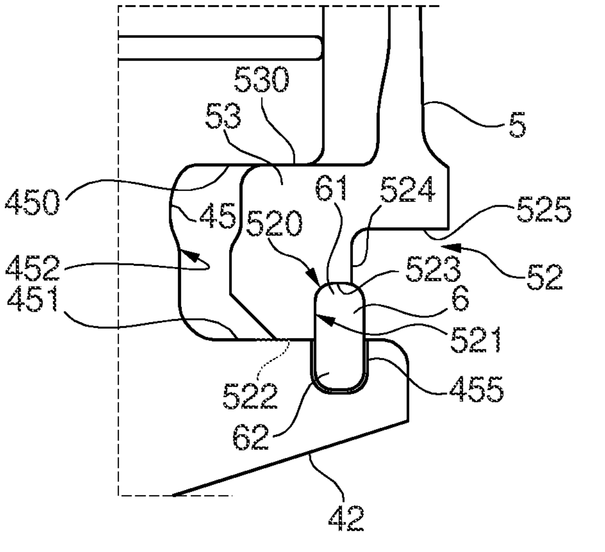
Figure 2B:
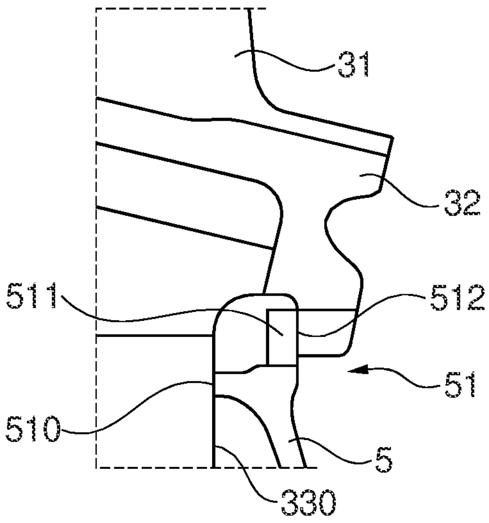
Figure 7:
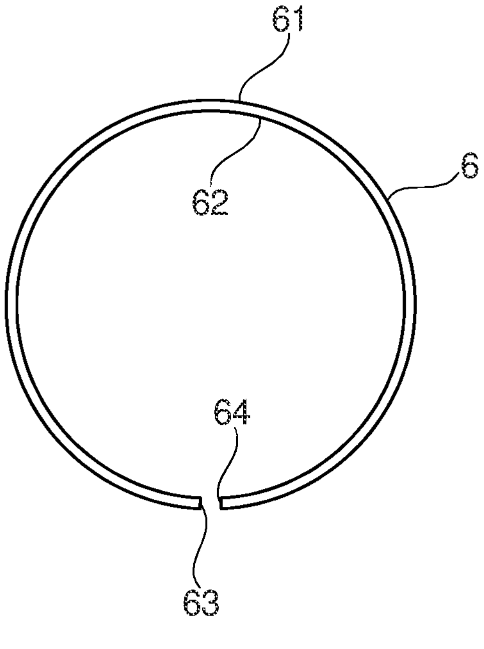
Figure 8:
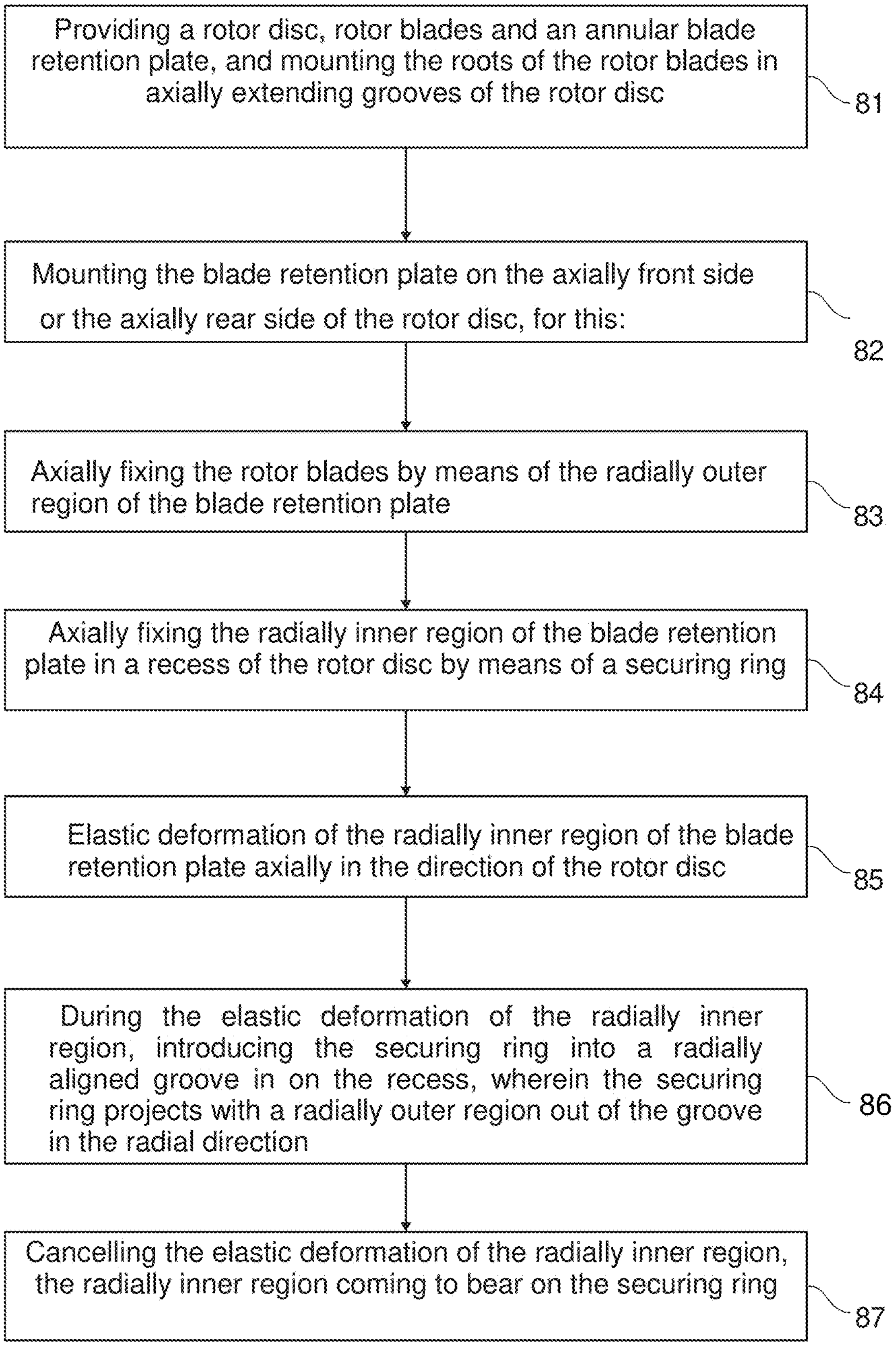

FIG. 2*a* shows an enlarged illustration of the radially inner region of the blade retention plate from FIG. 2;

FIG. 2*b* shows an enlarged illustration of the radially outer region of the blade retention plate from FIG. 2;

FIGS. 3-6 show the assembly according to FIG. 2 in a plurality of successive mounting steps;

FIG. 7 shows a plan view of the securing ring of the assembly from FIG. 2; and FIG. 8 shows a flowchart of a method for fastening a blade retention plate to a rotor disc of a gas turbine engine FIG. 1 illustrates a gas turbine engine 10 having a main axis of rotation 9. The engine 10 comprises an air intake 12 and a thrust fan 23 that generates two air flows: a core air flow A and a bypass air flow B. The gas turbine engine 10 comprises a core 11 which receives the core air flow A. In the sequence of axial flow, the engine core 11 comprises a low-pressure compressor 14, a high-pressure compressor 15, a combustion device 16, a high-pressure turbine 17, a low-pressure turbine 19, and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 by way of a shaft 26 and an epicyclic gear box 30.

During use, the core air flow A is accelerated and compressed by the low-pressure compressor 14 and directed into the high-pressure compressor 15, where further compression takes place. The compressed air expelled from the high-pressure compressor 15 is directed into the combustion device 16, where it is mixed with fuel and the mixture is combusted. The resulting hot combustion products then propagate through the high-pressure and the low-pressure turbines 17, 19 and thereby drive said turbines, before they are expelled through the nozzle 20 to provide a certain thrust. The high-pressure turbine 17 drives the high-pressure compressor 15 by means of a suitable connecting shaft 27. The fan 23 generally provides the major part of the thrust force. The epicyclic gear box 30 is a reduction gear box.

It is noted that the terms "low-pressure turbine" and "low-pressure compressor" as used herein can be taken to mean the lowest-pressure turbine stage and the lowest-pressure compressor stage (that is to say not including the fan 23) respectively and/or the turbine and compressor stages that are connected to one another by the connecting shaft 26 with the lowest rotational speed in the engine (that is to say not including the gear box output shaft that drives the fan 23). In some documents, the "low-pressure turbine" and the "low-pressure compressor" referred to herein may alternatively be known as the "intermediate-pressure turbine" and "intermediate-pressure compressor". Where such alternative nomenclature is used, the fan 23 can be referred to as a first compression stage or lowest-pressure compression stage.

Other gas turbine engines in which the present disclosure can be used may have alternative configurations. For example, such engines may have an alternative number of compressors and/or turbines and/or an alternative number of connecting shafts. As a further example, the gas turbine engine shown in FIG. 1 has a split flow nozzle 20, 22, which means that the flow through the bypass duct 22 has its own nozzle, which is separate from the engine core nozzle 20 and is radially outside the latter. However, this is not restrictive, and any aspect of the present disclosure can also apply to engines in which the flow through the bypass duct 22 and the flow through the core 11 are mixed or combined before (or upstream of) a single nozzle, which may be referred to as a mixed flow nozzle. One or both nozzles (whether mixed or split flow) can have a fixed or variable region. Although the example described relates to a turbofan engine, the disclosure can be applied, for example, to any type of gas turbine engine, such as, for example, an open rotor engine (in which the fan stage is not surrounded by an engine nacelle) or a turboprop engine. In some arrangements, the gas turbine engine 10 possibly does not comprise a gear box 30.

The geometry of the gas turbine engine 10, and components thereof, is/are defined by a conventional axis system, which comprises an axial direction (which is aligned with the rotation axis 9), a radial direction (in the direction from bottom to top in FIG. 1), and a circumferential direction (perpendicular to the view in FIG. 1). The axial, radial and circumferential directions are perpendicular to one another.

In the context of the present invention, an assembly which is implemented in the high-pressure turbine 17 and/or low pressure turbine 19 and comprises a rotor of at least one stage of the high-pressure turbine 17 and/or the low pressure turbine 19 is of importance The assembly according to the invention can in principle be implemented in at least one turbine stage of any desired gas turbine engine, the gas turbine engine 10 of FIG. 1 merely being exemplary.

FIG. 2 shows an exemplary embodiment of a rotor of this kind schematically. The assembly comprises a rotor disc 4, which can also be designated as a turbine disc. The rotor disc 4 has an axially front side 41 and an axially rear side 42. It further comprises a radially outer side 43, in which there are axially extending grooves 44 with a dovetail profile or another profile suitable for a form-fitting connection.

The assembly further comprises a plurality of rotor blades 3, which are connected to the rotor disc 4 and adjoin one another in the circumferential direction. Each rotor blade 3 has a blade leaf 31, a platform 32 and a blade root 33. The blade leaves 31 extend in the main flow path of the gas turbine engine The platforms 32 of the rotor blades 3 together form a radially inner flow path limit of the main flow path. The blade roots 33 are inserted into the grooves 44 of the rotor disc 4 and in this way connect the rotor blades 3 to the rotor disc 4.

The assembly further comprises a blade retention plate 5. The blade retention plate 5 is annular and thus extends only over a defined radial region. In FIG. 2 and also in the further figures, the blade retention plate 5 is fastened to the rotor disc 4 on the axially rear side 42 thereof. In principle, however, it is possible to arrange a blade retention plate alternatively on the axially front side 41 of the rotor disc 4. It is also possible for a blade retention plate to be arranged both on the axially front side 41 and on the axially rear side 42 of the rotor disc.

The arrow D of FIG. 1 identifies, schematically, cooling secondary air which, amongst other things, flows via the axial grooves 44 into cooling air openings/passages in the lower region of the blade roots of the rotor blades and, for example, is taken from a compressor of the gas turbine engine. It is used to cool the rotor blades 3. If the blade retention plate 5 adjoins the axially rear side 42 of the rotor disc 4, as illustrated in the figures, the blade retention plate 5 also fulfils a sealing function, since it prevents the cooling secondary air from escaping unused into the air chamber downstream of the rotor disc.

The blade retention plate 5 comprises a radially outer region 51 and a radially inner region 52. In the radially inner region 52, it forms a projection 53, which engages in a recess 45 on the axially rear side 42 of the rotor disc 4. Axial fixing of the radially inner region 52 of the blade retention plate 5 in the recess 45 is carried out by a securing ring 6, which is arranged in a radially aligned groove 455 of the recess 45 or the rotor disc 4. The radially inner region 52 of the blade retention plate 5 bears on the securing ring 6 under axial preload. The exact structure and the arrangement of the blade retention plate 5 on the rotor disc 4 and on the rotor blades 3 is explained with reference to FIGS. 2*a* and 2*b*.

FIG. 2*a* is an enlarged illustration of a portion of FIG. 2 and shows the arrangement and fastening of the radially inner region 52 of the blade retention plate 5 to the axially rear side 42 of the rotor disc 4. According to the figure, the recess 45 formed on the axially rear side 42 of the rotor disc 4 comprises two radially spaced, respectively axially aligned surfaces 450, 451 and a bottom surface 452, which define the recess 45. Formed in the radially inner surface 451 is a radially outwardly aligned groove 455, which is used to receive the securing ring 6.

The radially inner part of the bottom surface 452 can be used to limit the deformation of the blade retention plate physically, which means that the risk of over-stretching (plastic deformation) of the blade retention plate or damage to the radially outer regions of the bottom surface, which are typically highly loaded, can be reduced.

The groove 455 is thus formed in a surface 451 which delimits the recess 45. This case is designated in brief by the groove 455 being formed in the recess 45. Alternatively, the groove 455 can be formed in a region of the rotor disc which adjoins the recess. This case is designated in brief by the groove 455 being formed on the recess 45. Because of its position, the groove 455 fulfils the function of receiving the securing ring 6 in a position in which the latter fixes the radially inner region 52 of the blade retention plate axially.

The securing ring 6 comprises a radially inner region 62, which extends in the groove 455, and a radially outer region 61, which projects radially with respect to the groove and the surface 451. The securing ring 6 is illustrated in plan view in FIG. 7. According to the figure, the securing ring 6 is formed as an open ring with two adjacent ends 63, 64. As it is introduced or pressed into the groove 455, the ring 6 is compressed radially, so that its adjacent ends 63, 64 approach each other and are arranged at a close distance from or adjacent to each other. The ring 6 is arranged to be compressed at a maximum in the groove 455, wherein it can extend as far as the bottom of the groove 455.

The projection 53 of the blade retention plate 5, which projects into the recess 45, comprises two radially spaced, respectively axially aligned surfaces 530, 522. The radially inner of these surfaces 522 constitutes an axially extending surface of a step 520, which forms the projection 53 radially inwardly on its axially rear side. The step 520 comprises a radially extending first surface 521, which connects the axially extending surface 522 to a further axially extending surface 523 and extends perpendicular to the two last-named. In the mounted state of FIGS. 2, 2*a*, the inner region 52 of the blade retention plate 5 bears with the radially extending first surface 521 on the radially outer region 61 of the securing ring 6 that projects out of the groove 455.

On its axially rear side adjacent to the step 520, the projection 53 has a further step, which comprises two surfaces 524, 525 perpendicular to each other.

The radially inner region 52 of the blade retention plate 5 has been elastically deformed axially in the direction of the rotor disc 4 during the mounting, the projection 53 having been displaced far into the recess 45, as will be explained by using FIGS. 3-6. The axially extending surface 530 of the projection 53 adjoins the axially extending surface 450 of the recess 45. Likewise, the axially extending surface 522 of the projection 53 bears on the axially extending surface 451 of the recess 45. As a result, the projection 53 and therefore the blade retention plate 5 are fixed to the rotor disc 4 in the radial direction. Provision is made that, during the mounting, the axial surfaces 530 and 450 and also 522 and 451 do not come into contact. Thus, contact between these surfaces can lead to the blade retention plate 5 no longer springing back on its own. Refinements provide that, before the mounting of the assembly, the rotor disc is heated and/or the blade retention plate is cooled, in order to reduce the risk of jamming of the blade retention plate 5.

In the state in which, during the mounting, the projection 53 has been displaced far into the recess 45, the securing ring 6 has been inserted into the groove 455. The installation space required for this has been created by the elastic deformation of the radially inner region 52 and the associated displacement of the projection 53 into the recess 45 of the blade retention plate 5. Following the insertion of the securing ring 6 into the groove 455, the elastic deformation was ended, so that the projection 53 moved axially rearward (or sprang back), the radially extending surface 521 having come to bear on the securing ring 6. Accordingly, the radially inner region 52, specifically the radially extending surface 521 of the projection 53, bears on the securing ring 6 under axial preload.

FIG. 2*b* is an enlarged illustration of a portion of FIG. 2 and shows the arrangement of the radially outer region 51 of the blade retention plate 5 on the rotor blades 3 in order to fix these axially. According to the figure, the radially outer region 51 forms a radially extending supporting surface 510, which adjoins an axially rear end face 330 of the blade roots 33 arranged in the grooves 44 and prevents an axial movement of the blade roots 33 and therefore of the rotor blades 3 towards the rear. The axial fixing of the rotor blades 3 is the purpose of the blade retention plate 5.

In order to achieve the situation in which the rotor blades 3 are axially fixed in both directions (axially towards the front and axially towards the rear), provision can be made, for example, for the blade retention plate 5 to have in the radially outer region 51 a radial extension 511, which bears with a radially extending surface 512 on a correspondingly radially extending surface on the underside of the platform 32. Alternatively, for this purpose provision can be made for the radially outer end of the blade retention plate 5 (for example having a radial extension corresponding to the extension 511) to project into a radially inwardly directed groove on the axially rear end of the rotor blades 3 or the platform 32. The radial extension 511 can be formed to be circumferential or with recesses. A radially inwardly directed groove can also be designed to be circumferential, like the radial extension, or have recesses.

In the event of high requirements on the sealing function of the blade retention plate, the surfaces 511 and 512 are designed to be circumferential in order to reduce the leakage air flow in the radially outer region 51 (specifically between the radial extension 511 and the inwardly directed groove at the axially rear end of the platform 32) to a minimum.

The aforementioned components 3, 4, 5 of the assembly are constituent parts of a rotor of a turbine stage, wherein the turbine stage comprises a stator, not illustrated, in addition to the rotor, in a manner known per se.

FIGS. 3-6 show various stages during the production of the assembly according to FIG. 2.

Figure 3:
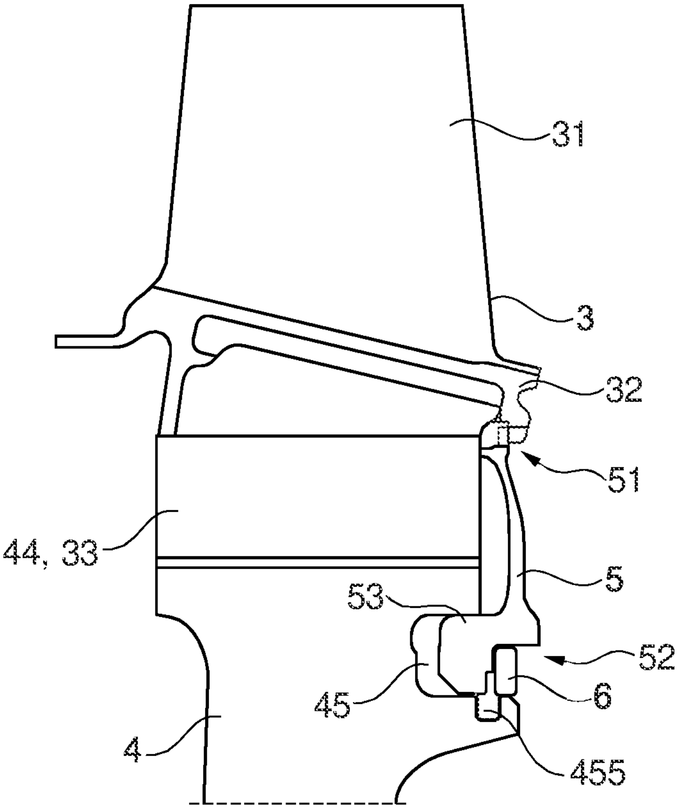

According to FIG. 3, the blade retention plate 5 is first positioned in its radially outer region 51 such that it fixes the rotor blades 3 axially. For this purpose, for example corresponding to FIG. 2*b*, the supporting surface 510 and the radial extension 511 are positioned in the way illustrated In the radially inner region 52, the projection 53 of the blade retaining plate is only inserted slightly into the recess 45. The securing ring 6 has not yet been inserted into the groove 455. In order to be able to insert the securing ring 6 into the groove 455 in a straightforward way in a later step, provision can be made for the securing ring 6 to be, for example, pre-mounted on the projection 53.

The external diameter of the securing ring 6 in the free position is only somewhat larger than the diameter of the surface 523. Thus, for the pre-mounting, the securing ring 6 must be stretched radially (for example by forcing the two adjacent ends 63, 64 of the securing ring 6 apart) until the said ring can be inserted between the inner axial surface 451 of the recess 45 and the axial surface 525. As a result of the radial stretching of the securing ring 6, the latter slides automatically into the groove 455 during the final mounting and only has to be compressed somewhat so that, as the blade retention plate springs back, the surface 523 of the step 520 can slide unimpededly over the external diameter of the securing ring 6.

Figure 4:
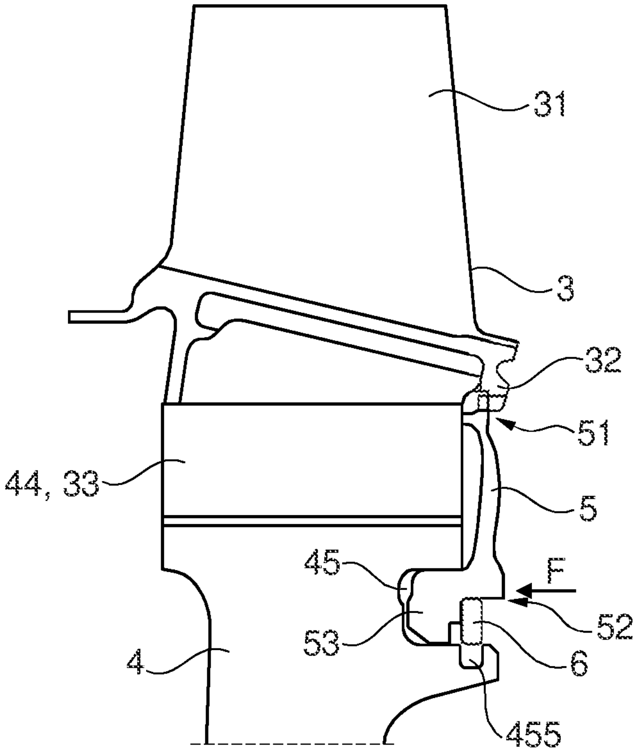

According to FIG. 4, a force F acting axially forwards is exerted on the radially inner region 52 of the blade retention plate 5, which leads to the radially inner region being elastically deformed in the direction of the rotor disc 4, the projection 53 being moved substantially completely into the recess 45 of the rotor disc 4. As soon as the securing ring 6 is located completely over the groove 450, the former moves radially inwards into the groove 450 on account of its radial preload.

Figure 5:
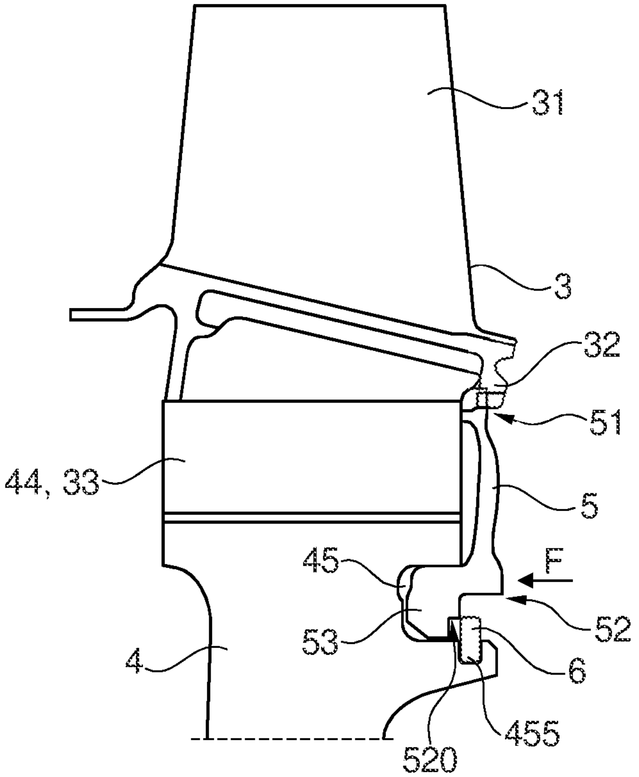

According to FIG. 5, the ring 6 is then compressed radially as far as possible, wherein the gap illustrated in FIG. 7 between the ends 63, 64 is still further closed or possibly entirely closed. The securing ring 6 can extend as far as the bottom of the groove 455, a radially outer region projecting out of the groove 455.

Figure 6:
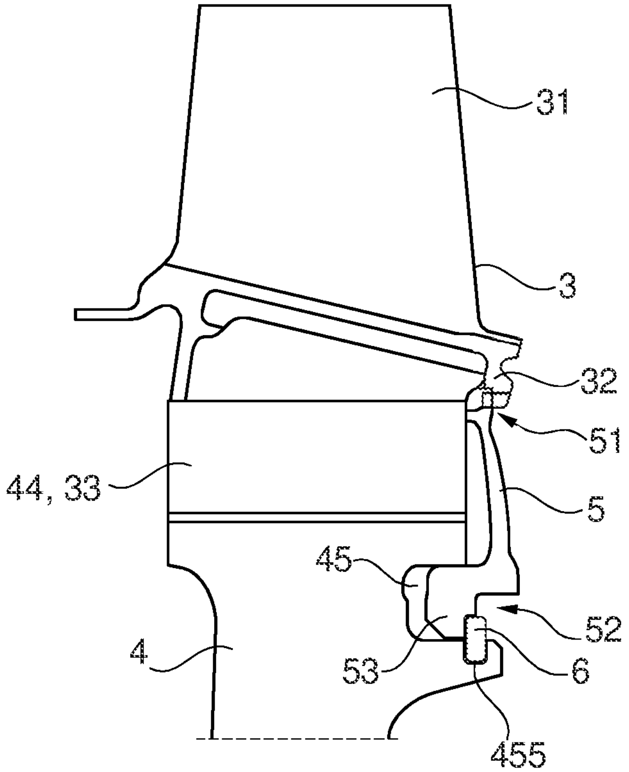

According to FIG. 6, the force F acting axially forwards is removed again This leads to the radially inner region 52 and therefore the projection 53 moving back axially towards the rear or springing back. The radially extending surface 521 of the step 520 of the projection 53 comes to bear on the radially outer region 61 of the securing ring 6 which projects out of the groove 455, as illustrated in FIG. 2*a*. The securing ring 6 stops the radially inner region 52 springing back when the force F falls away. The radially inner region 52 of the blade retention plate 52 correspondingly bears under axial preload on the outer side of the rotor disc in the region of the axially extending grooves and on the securing ring 6.

At the same time, the radially inner region 52 is also fixed in the radial direction with respect to the rotor disc 4 via the projection 53. Otherwise, FIG. 6 corresponds to FIG. 2, so that reference is made to the explanations appertaining thereto.

FIG. 8 summarizes the method steps for fastening the blade retention plate 5 to the rotor disc 4. Firstly, according to step 81, a rotor disc, rotor blades and a blade retention plate are provided in the manner described. In addition, the roots of the rotor blades are inserted into the axially extending grooves of the rotor disc, so that the rotor blades are firmly fastened to the rotor disc.

Further, in step 82, the blade retention plate is mounted on the axially front side or the axially rear side of the rotor disc, mounting on the axially rear side of the rotor disc being carried out when the blade retention plate is also intended to fulfil a sealing function with regard to the sealing of the secondary air, e.g. for cooling the rotor blades.

As mentioned, in a variant, all the rotor blades can also be mounted in the rotor disc together with the blade retention plate.

According to step 83, the rotor blades are fixed axially by means of the radially outer region of the blade retaining plate. This is done, for example, via the supporting surface 510 and axial fixing of the radial extension 511 according to FIG. 2*b*. Furthermore, according to step 84, the radially inner region of the blade retention plate is fixed in a recess of the rotor disc by means of a securing ring. To this end, the steps 85-87 are carried out.

According to step 85, the radially inner region of the blade retention plate is elastically deformed axially in the direction of the rotor disc. This is done by applying a force which acts radially forwards onto the radially inner region of the blade retention plate. During the elastic deformation of the radially inner region, according to step 86 the securing ring is introduced into a radially aligned grove in or on the recess and pressed into the groove, the securing ring projecting with a radially outer region in the radial direction out of the groove. In step 87, the elastic deformation of the radially inner region is cancelled by the force no longer being applied, the radially inner region of the blade retention plate coming to bear on the securing ring. The blade retention plate then bears under axial preload on the outer side of the rotor disc in the region of the axially extending grooves and on the securing ring.

It goes without saying that the invention is not restricted to the embodiments described above, and various modifications and improvements can be made without departing from the concepts described here. For example, provision can be made for a plurality of securing rings to be provided, which are arranged axially one after another in the radially aligned groove. If only one securing ring is used, the axial wall thickness of the ring is critical for the required axial deformation of the blade retention plate. The use of a plurality of securing rings has the following advantages:

a) Without enlarging the axially required deformation of the blade retention plate, by means of the use of a plurality of securing rings the effective axial wall thickness of the rings can be enlarged, which also means that larger axial forces can be absorbed by the securing rings.

b) For the case in which only low axial deformation of the blade retention plate is permissible, the required axial deformation of the blade retention plate can be reduced by the use of a plurality of securing rings (e.g. if two rings are used instead of only one ring, the required axial deformation of the blade retention plate is reduced by the factor 2), without having to reduce the effective axial wall thickness of the securing rings, i.e. it is still possible for exactly the same size of axial forces to be absorbed by the securing rings.

It corresponds to this refinement if the securing ring considered according to the invention consists of partial rings of the same diameter which, during the mounting, are gradually successively arranged axially one after another in the groove.

It is pointed out that any of the features described can be used separately or in combination with any other features, unless they are mutually exclusive. The disclosure extends to and comprises all combinations and sub-combinations of one or more features which are described here and comprises these. If ranges are defined, these ranges therefore comprise all the values within these ranges as well as all the partial ranges that lie within a range.

The invention claimed is:

1. An assembly for a gas turbine engine, which has:

a rotor disc with an axially front side, an axially rear side and a radially outer side, axially extending grooves being formed in the radially outer side, rotor blades which each have a blade leaf, a platform and a blade root, wherein the blade roots extend radially inwards from the platform and are respectively inserted into the axially extending grooves, a securing ring;

a radially aligned groove for receiving at least a portion of the securing ring, the radially aligned groove formed in or on a recess on the axially front side or on the axially rear side of the rotor disc, the securing ring, when positioned in the radially aligned groove, projecting radially outwardly of the radially aligned groove with a radially outer region;

an annular blade retention plate, which adjoins the axially front side or the axially rear side of the rotor disc and which includes:

a radially outer region, which fixes the rotor blades axially, a radially inner region, which is fixed axially by the securing ring, the radially inner region including:

a first notch at least partially open in the direction away from the rotor disc;

a second notch at least partially open in the direction away from the rotor disc;

wherein the second notch is adjacent the first notch;

wherein the second notch is positioned radially inwardly of the first notch and the second notch is positioned axially closer to the rotor disc than the first notch, such that the first notch and the second notch together form a stepped configuration;

wherein the first notch is configured to receive the radially outer region of the securing ring in a radially and axially outward first position when the securing ring is positioned outside the radially aligned groove;

wherein the second notch is configured to receive the radially outer region of the securing ring in a second position that is radially and axially inward of the first position, when the securing ring is positioned in the radially aligned groove;

wherein the radially inner region of the blade retention plate bears on the securing ring under axial preload.

2. The assembly according to claim 1, wherein the securing ring is formed as an open ring with two adjacent ends and is compressed radially in the radially aligned groove.

3. The assembly according to claim 1, wherein the second notch bears on the radially outer region of the securing ring which projects out of the radially aligned groove.

4. The assembly according to claim 1, wherein blade retention plate includes a projection which projects into the recess.

5. The assembly according to claim 4, wherein the projection has an axially extending surface, which bears on an axially extending surface of the recess and fixes the blade retention plate in a radial direction.

6. The assembly according to claim 1, wherein the radially outer region of the blade retention plate axially fixes the blade roots of the rotor blades that are inserted into the axially extending grooves.

7. A gas turbine engine including the assembly according to claim 1, wherein the gas turbine engine has a turbine which comprises at least one stage having a stator and a rotor, and the assembly is implemented on the rotor of the stage.

8. A method for fastening a blade retention plate to a rotor disc of a gas turbine engine, which comprises the steps:

providing a rotor disc which as an axially front side, an axially rear side and a radially outer side, wherein axially extending grooves are formed in the radially outer side and a recess is formed on the axially front side and/or on the axially rear side, providing rotor blades, which each have a blade leaf, a platform and a blade root, providing a securing ring;

providing a radially aligned groove for receiving at least a portion of the securing ring, the radially aligned groove formed in or on the recess on the axially front side or on the axially rear side of the rotor disc, the securing ring, when positioned in the radially aligned groove, projecting radially outwardly of the radially aligned groove with a radially outer region;

providing an annular blade retention plate, which has a radially outer region and a radially inner region, mounting the blade roots of the rotor blades in the axially extending grooves of the rotor disc, mounting the blade retention plate on the axially front side or the axially rear side of the rotor disc, wherein the radially outer region of the blade retention plate fixes the rotor blades axially, the radially inner region of the blade retention plate is fixed axially by the securing ring, providing that the radially inner region includes:

a first notch at least partially open in the direction away from the rotor disc;

a second notch at least partially open in the direction away from the rotor disc;

wherein the second notch is adjacent the first notch;

wherein the second notch is positioned radially inwardly of the first notch and the second notch is positioned axially closer to the rotor disc than the first notch, such that the first notch and the second notch together form a stepped configuration;

wherein the first notch is configured to receive the radially outer region of the securing ring in a radially and axially outward first position when the securing ring is positioned outside the radially aligned groove;

wherein the second notch is configured to receive the radially outer region of the securing ring in a second position that is radially and axially inward of the first position, when the securing ring is positioned in the radially aligned groove;

applying a force to the radially inner region of the blade retention plate to elastically deform the radially inner region axially in a direction of the rotor disc, then, during the elastic deformation of the radially inner region, introducing the securing ring into the radially aligned groove, the securing ring projecting with a radially outer region out of the radially aligned groove in a radial direction, and cancelling the elastic deformation of the radially inner region to allow the radially inner region to bear on the securing ring.

9. The method according to claim 8, wherein the securing ring is compressed radially as it is introduced into the radially aligned groove.

10. The method according to claim 8, wherein the second notch comes to bear on the radially outer region of the securing ring that projects out of the radially aligned groove.

11. The methodMethed according to claim 8, wherein the blade retention plate is fixed in a radial direction by a projection in the recess.

12. The method according to claim 8, wherein the securing ring is stretched radially during pre-mounting and, during mounting, slides automatically into the radially aligned groove and is compressed further in the radially aligned groove.

13. The method according to claim 8, wherein the blade retention plate is mounted on the axially rear side of the rotor disc, wherein the blade retention plate additionally fulfils a sealing function in its radially outer region.

* * * * *